(12) United States Patent
Omatoi

(10) Patent No.: US 7,199,388 B2
(45) Date of Patent: Apr. 3, 2007

(54) LIQUID LEVEL DETECTING DEVICE

(76) Inventor: Naoyuki Omatoi, 10-12,
Kugenuma-Matsugaoka 2-chome,
Fujisawa-shi, Kanagawa 251-0038 (JP)

( * ) Notice: Subject to any disclaimer, the term of this patent is extended or adjusted under 35 U.S.C. 154(b) by 261 days.

(21) Appl. No.: 10/480,443

(22) PCT Filed: Jun. 12, 2002

(86) PCT No.: PCT/JP02/05842

§ 371 (c)(1),
(2), (4) Date: Jun. 4, 2004

(87) PCT Pub. No.: WO02/101337

PCT Pub. Date: Dec. 19, 2002

(65) Prior Publication Data

US 2004/0232364 A1    Nov. 25, 2004

(30) Foreign Application Priority Data

Jun. 12, 2001   (JP) .............................. 2001-177092

(51) Int. Cl.
G01N 15/06 (2006.01)
G01F 23/00 (2006.01)
G08B 21/00 (2006.01)
(52) U.S. Cl. ........................ 250/573; 250/574; 73/293; 340/618
(58) Field of Classification Search ................ 250/573, 250/574, 575, 576, 577; 356/436; 340/618, 340/619; 73/293, 1.31
See application file for complete search history.

(56) References Cited

U.S. PATENT DOCUMENTS 4,554,837 A * 11/1985 Danby et al. ................. 73/705

6,333,512 B1 * 12/2001 Wirthlin ..................... 250/577
6,664,558 B1 * 12/2003 Barbier ....................... 250/577

FOREIGN PATENT DOCUMENTS

JP   2000-321116   11/2000
JP   2000-329607   11/2000

* cited by examiner

*Primary Examiner*—Georgia Epps
*Assistant Examiner*—Don Williams
(74) *Attorney, Agent, or Firm*—Louis Woo

(57) ABSTRACT

The present invention aims at attaining a liquid surface level detecting apparatus, which can be used in various detection targets and usage environments without selecting a detection target, can efficiently irradiate a light to a liquid surface level detecting unit and detect a variation in a light reception amount of a light receiving means at a high sensibility, and can be excellent in durability, easy to manufacture, and be actually used. By placing a light shielding means 14 so as not to directly irradiate the light from a light emitting means 12 to a light receiving means 13, the light from the light emitting means is scattered by an optically scattering means 16, and a part of that scattering light is radiated to an outside by the liquid surface level detecting unit on a light radiating means (an optically transmitting member) 11. On the other hand, the scattering light, which is reflected without being radiated, is received by the light receiving means, and the change in that light reception amount is detected. Consequently, if a liquid 17 exists in the outside, a light amount, which is reflected by a boundary between the liquid and the light radiating means and returned to an inside of the light radiating means, is reduced, and the light reception amount in the light receiving means is also reduced. Thus, by measuring the change in the light reception amount, it is possible to detect a liquid surface level of the liquid.

14 Claims, 14 Drawing Sheets

DIAGRAMMATIC GRAPH SHOWING CHANGE IN
LIGHT RECEPTION AMOUNT OF LIGHT
RECEIVING MEANS

LIQUID LEVEL DETECTING DEVICE

TECHNICAL FIELD

The present invention relates to a liquid level detecting device which is also referred to a liquid surface level detecting apparatus, which is kept in a vessel such as a tank, a pipe, a drum can or the like, for detecting a liquid surface level of a liquid that can not be easily checked from outside, and more particularly to an apparatus for carrying out a liquid surface level detection by using a scattering light.

BACKGROUND ART

FIG. 7 is a sectional view of one example of a conventional liquid surface level detecting apparatus that uses a reflection of light by a prism. A liquid surface level detecting apparatus 100 shown in FIG. 7 is provided with: an optically transmitting member 102 which has an end (hereafter, referred to as a prism section 101) cut to a predetermined shape and is made of bar-shaped fluoro-resin or glass and the like; a light emitting means 103 for emitting the light to a longitudinal direction of the optically transmitting member 102 toward the prism section 101; a light receiving means 104 for receiving a reflection light which is returned to the longitudinal direction of the optically transmitting member 102 from the prism section 101 after the light emitted by the light emitting means 103 is reflected by the prism section 101; and an IC 105 for measuring a light amount of the reflection light received by the light receiving means 104 and outputting its measured result.

Also, in such a way that the light emitted by the light emitting means 103 can be efficiently received by the light receiving means 104, the predetermined shape of the prism section 101 is defined. For example, it is defined such that the emitted light is totally reflected by the prism section 101, and such that the total reflection light is returned to the light receiving means 104. That is, when a refractive index of the optically transmitting member 102 is assumed to be nt and a refractive index of air is assumed to be $n_s$ ($n_s \approx 1$), in such a way that an irradiation angle of the light from the light emitting means 103 becomes $\sin \theta_o = n_s/n_t$, a predetermined shape of a low end of the prism section 101 and the installation positions of the light emitting means 103 and the light receiving means 104 are defined.

If a liquid surface level 107 of a liquid 106 is brought into contact with a portion to which the light of the prism section 101 is irradiated, a refractive index of an outside of the prism section 101 is changed (usually, since a refractive index of the liquid 106 is greater than the air, the refractive index of the outside becomes greater), a total reflection angle $\theta_o$ is changed. Consequently, the light from the light emitting means 103 is radiated to an inside of the liquid 106, and the light amount returned to the light receiving means 104 is largely reduced. By measuring the change in this light amount, the fact that the liquid surface level 107 is brought into contact with the low end is detected.

However, in the liquid surface level detecting apparatus 100 of FIG. 7, a liquid surface level detecting unit exists in the prism section 101 at the low end. Thus, once the liquid surface level of the liquid 106 is detected, liquid drops continue to be deposited. Hence, there may be a case that an erroneous operation is induced in the liquid surface level detection or that the liquid surface level detection can not be done. A liquid surface level detecting apparatus that tries to improve this problem is a liquid surface level detecting apparatus shown in FIG. 8 as described below.

FIG. 8 is a sectional view of one example of the conventional liquid surface level detecting apparatus that uses the total reflection light. A liquid surface level detecting apparatus 200 shown in FIG. 8 is provided with: an optically transmitting member 201 which is hollow and made of bar-shaped fluoro-resin or glass and the like; a light emitting means 202 and a light receiving means 203 which are placed in the hollow section therein and composed of optical fibers and the like; a light shielding wall 204 for avoiding a light from the light emitting means 202 from being directly irradiated to the light receiving means 203; and an IC 205 for measuring a light amount received by the light receiving means 203 and outputting its measured result.

Also, if a liquid 206 does not exist in an outside (namely, if the outside is air), in such a way that the light is totally reflected by an outer wall on a side of the optically transmitting member 201, angles of those light emitting means 202 and light receiving means 203 are established. That is, when a refractive index of the optically transmitting member 201 is assumed to be nt and a refractive index of the air is assumed to be $n_s$ ($n_s \approx 1$), in such a way that the light is inputted at an input angle larger than a critical angle $\theta_o$ in which an irradiation angle of the light from the light emitting means 202 is determined by $\sin \theta_o = n_s/n_t$, the light emitting means 202 is placed. Also, the light receiving means 203 is placed at a position having the same reflection angle as the input angle from the light emitting means 202, in such a way that the total reflection light from the outer wall of the optically transmitting member 201 can be efficiently received.

As mentioned above, if the outside is the air, the light from the light emitting means 202 is totally reflected by the outer wall of the optically transmitting member 201 and received by the light receiving means 203. However, if a liquid surface level 207 is brought into contact with a location (hereafter, referred to as a total reflection unit) where the light of the side of the optically transmitting member 201 is totally reflected, the refractive index of the outside of the above-mentioned optically transmitting member 201 is changed, and the critical angle $\theta_o$ is changed. Consequently, the light from the light emitting means 202 is radiated to an inside of the liquid 206, thereby greatly reducing a light amount returned to the light receiving means 203. By measuring the change in this light amount, the fact that the liquid surface level 207 is brought into contact with the total reflection unit is detected. In the liquid surface level detection using such a total reflection, if the liquid 206 exists in the total reflection unit, the total reflection of the light is not induced, and its reflection light amount is dramatically changed. Hence, the change amount in the light amount of the light receiving means is great, and it is possible to carry out the liquid surface level detection whose precision is high.

Also, Japanese Laid Open Patent Application (JP-A 2000-329607) and Japanese Laid Open Patent Application (JP-A 2000-321116) disclose a liquid surface level sensor for scattering a propagation light, and consequently measuring an attenuation amount of the propagation light, and then detecting a liquid surface level. For example, Japanese Laid Open Patent Application (JP-A 2000-329607) discloses a liquid surface level sensor 300 that uses a scattering light in which the propagation light is scattered as shown in FIG. 9.

This liquid surface level sensor 300 passes and scatters the propagation light through a light scattering member (particle body) 301, and consequently generates the scattering light, radiates the scattering light from a sensing section 302 to outside, and measures the attenuation amount of the propagation light attenuated by the influence of the liquid existing in the outside, and then detects the liquid surface level. Also, besides FIG. 9, for example, as shown in FIG. 10, a configuration in which optically transmitting materials whose refractive indexes are different are placed on the entire U-shaped section is disclosed.

However, the liquid surface level detecting apparatus shown in FIG. 8 carries out the liquid surface level detection through the total reflection. For example, if the liquid surface level detection of a liquid having a high viscosity coefficient is once carried out and that liquid surface level detecting apparatus is again used to carry out the liquid surface level detection, the liquid drops are deposited on the total reflection unit. Thus, the total reflection on the total reflection unit is never induced. Hence, there is a problem that the liquid surface level detection is impossible unless the liquid drops are removed. Also, if oil film and contaminant are deposited on the total reflection unit, similarly, there is a problem of a possibility that an erroneous operation is induced.

Also, in the liquid surface level detecting apparatus shown in FIG. 8, since the establishment of the critical angle to define the total reflection is carried out in the prism section and the total reflection unit, it is necessary to establish the various conditions such as the angle of the prism section, the installation positions and installation angles of the light emitting means and the light receiving means, the distance from the light emitting means to the light receiving means (namely, the distance in the longitudinal direction of the light shielding wall), and the light emitting angle and the light receiving angle, and the like. For example, such as the case that even one omission from those conditions disables the liquid surface level detection and the like, there is a problem that the durability against the deterioration in the liquid surface level detecting apparatus caused by the various usage conditions, such as flaw and damage resulting from shock from the outside, acid-base property and the like, is very weak. Also, since those various conditions need to be established, there is a problem that the manufacturing of the liquid surface level detecting apparatus becomes precise and difficult.

Also, the liquid surface level detecting apparatus shown in FIG. 8 is established, for example, in such a way that with regard to the initial state at which the outside of the liquid surface level detecting unit is the air, the total reflection is induced, and within the predetermined detection target (liquid), the total reflection is not induced. On the other hand, such a detection target is different depending on a usage environment. Thus, there is a problem that depending on the establishment of the critical angle $\theta_o$, although the liquid having a high refractive index can be detected, the liquid having a low refractive index cannot be detected. Also, the conventional liquid surface level detecting apparatus has a problem that an erroneous operation is induced if the detection target is colored liquid.

Also, the liquid surface level detecting apparatus shown in FIG. 8 has the following problem. For example, it can detect a boundary between two layers of air and liquid. However, if it tries to detect a boundary between three layers of air, oil and water, it must use two kinds of liquid surface level detecting apparatuses. That is, one is a liquid surface level detecting apparatus which is established such that the change of the presence or absence of the total reflection is induced on the boundary between the air and the oil, and the other is a liquid surface level detecting apparatus which is established such that the change of the presence or absence of the total reflection is induced on the boundary between the oil and the water. By the way, in this specification, a boundary between a liquid phase and a gaseous phase and a boundary between different two liquid phases are referred to as a liquid surface.

Also, the liquid surface level sensor shown in FIG. 9 has the structure that the light emitted from the light emitting means is directly inputted to the light receiving means, and the light receiving means receives the considerable quantity of propagation light, even before the liquid surface level detection. The light directly inputted to the light receiving means from this light emitting means does not contribute to the liquid surface level detection and further greatly reduces the precision in the liquid surface level detection. In particular, at the time of the liquid surface level detection, if the scattering light amount radiated to the outside from the sensing section (namely, the attenuation amount of the propagation light by the light receiving means) is small, a variation rate of the light reception amount of the light receiving means (=the light reception amount after the liquid surface level detection/the light reception amount before the liquid surface level detection) becomes very small. Thus, it is very difficult to measure that variation. Hence, there is a problem that this is not practical.

Thus, in particular, if a distance L of the sensing section is made shorter in order to improve the precision in the liquid surface level detection, the scattering light amount radiated to the outside from the sensing section is inevitably reduced, thereby further reducing the variation rate of the light reception amount of the light receiving means. Hence, this liquid surface level sensor has a problem that unless the distance L of the sensing section is set to be considerably large, the liquid surface level detection is impossible and the precision in the liquid surface level detection is very low.

Also, as shown in FIG. 10, the liquid surface level sensor, in which the optically transmitting materials having the different refractive indexes are placed on the entire U-shaped section and the light is radiated from the U-shaped section, has the structure that the propagation path of the light is especially curved, and most of the propagation light is leaked as the scattering light to the outside, which results in the extreme reduction in the light reception amount of the light receiving means. Also, moreover, even if the liquid surface level is detected, it is impossible to accurately specify the liquid surface level. Thus, only the liquid surface level detection of the very low precision can be done. Hence, there is a problem that this is not practical.

DISCLOSURE OF THE INVENTION

In view of the above-mentioned problems, it is therefore an object of the present invention to provide a liquid surface level detecting apparatus, which can be used in various detection targets and usage environments without selecting a detection target, and even with regard to a liquid having a high viscosity, can continue to surely detect that liquid surface, and is excellent in a durability and easy to manufacture. Also, the present invention aims at providing the liquid surface level detecting apparatus, which can efficiently irradiate a light to a liquid surface level detecting unit and detect a variation in a light reception amount of a light receiving means at a high sensibility and can carry out a liquid surface level detection at an actually excellent sensibility.

In order to attain the above-mentioned object, the present invention is designed such that by placing a light shielding means for preventing a light from a light emitting means from being directly radiated to the light receiving means, a part of a scattering light scattered by an optically scattering means is outputted to an outside by the liquid surface level detecting unit, and on the other hand, the scattering light, which is reflected and returned without being radiated, is received by the light receiving means, and a change in its light reception amount is detected.

That is, the present invention provides a liquid surface level detecting apparatus for detecting a liquid surface level of a liquid existing in an outside, including:

a light emitting means for emitting a light;

an optically scattering means for scattering the light emitted by the light emitting means;

a light radiating means having a liquid surface level detecting unit for radiating a part of a scattering light scattered by the optically scattering means to an outside of the optically scattering means;

a light receiving means for receiving the scattering light which is reflected by and returned from a boundary of the outside of the optically scattering means or the light radiating means without being radiated by the light radiating means; and a light shielding means for shielding the light so that the light from the light emitting means is not directly irradiated to the light receiving means, wherein if the liquid exists in the outside, a radiation light amount to the outside of the light radiating means is changed, and that change is detected on the basis of the light reception amount of the light receiving means, thereby detecting the liquid surface level of the liquid.

Also, moreover, establishing a predetermined angle and placing the light emitting means or light receiving means is a preferable implementation of the present invention.

Also, moreover, placing a plurality of light receiving means is a preferable implementation of the present invention.

Also, moreover, arraying the plurality of light receiving means on a substantially flat surface is a preferable implementation of the present invention.

Also, moreover, covering the light shielding means with a film for light reflection in order to protect the light from being absorbed by the light shielding means is a preferable implementation of the present invention.

Also, moreover, enabling a standard light reception amount in the light receiving means to be established on the basis of a kind of the liquid, and comparing a light reception amount of the light receiving means with the standard light reception amount, and consequently detecting the liquid surface level of the liquid is a preferable implementation of the present invention.

Also, moreover, placing the optically scattering means around a light emitting unit of the light emitting means is a preferable implementation of the present invention.

Also, moreover, placing the optically scattering means around the liquid surface level detecting unit to which the light from the light emitting means is irradiated.

Also, moreover, the fact that the optically scattering means is silicon rubber is a preferable implementation of the present invention.

Also, moreover, the fact that the light radiating means is per-fluoro-alkoxy is a preferable implementation of the present invention.

Also, moreover, using a tungsten lamp as the light emitting means and using a glass optical fiber as the light receiving means are a preferable implementation of the present invention.

Also, moreover, by dipping the light radiating means into the liquid and measuring the liquid surface level of the liquid is a preferable implementation of the present invention.

Also, moreover, placing the light radiating means on an outer wall of a vessel having an optically transmitting property and detecting the liquid surface level of the liquid accommodated in the vessel is preferable implementation of the present invention.

Also, moreover, including a fixing means for enabling the light radiating means to be fixed on the wall of the vessel is a preferable implementation of the present invention.

BEST MODE FOR CARRYING OUT THE INVENTION

First Embodiment

Figure 1:
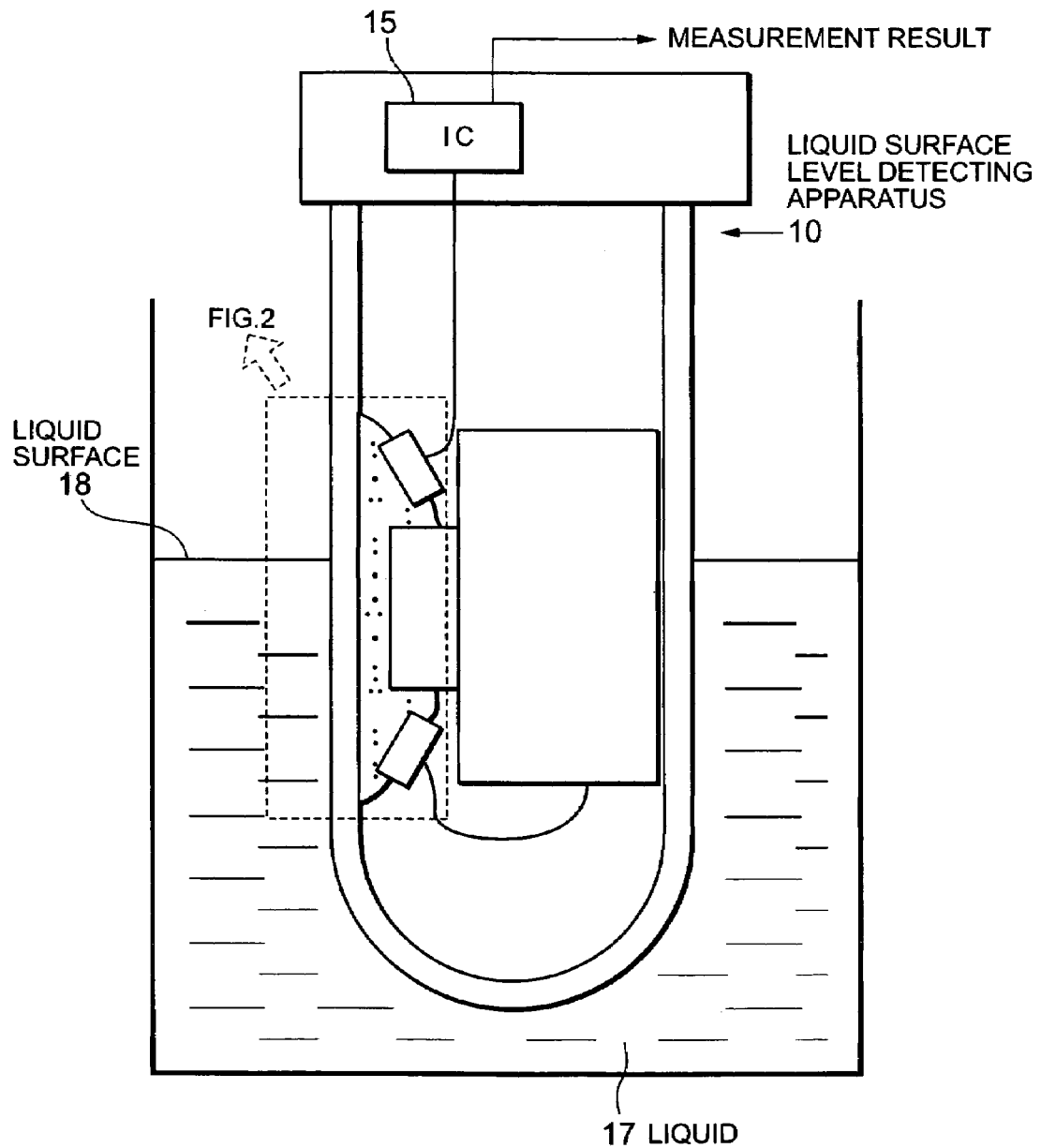
FIG. 1 is a diagrammatic view showing a usage state of a liquid surface level detecting apparatus in the present invention.
Figure 2:
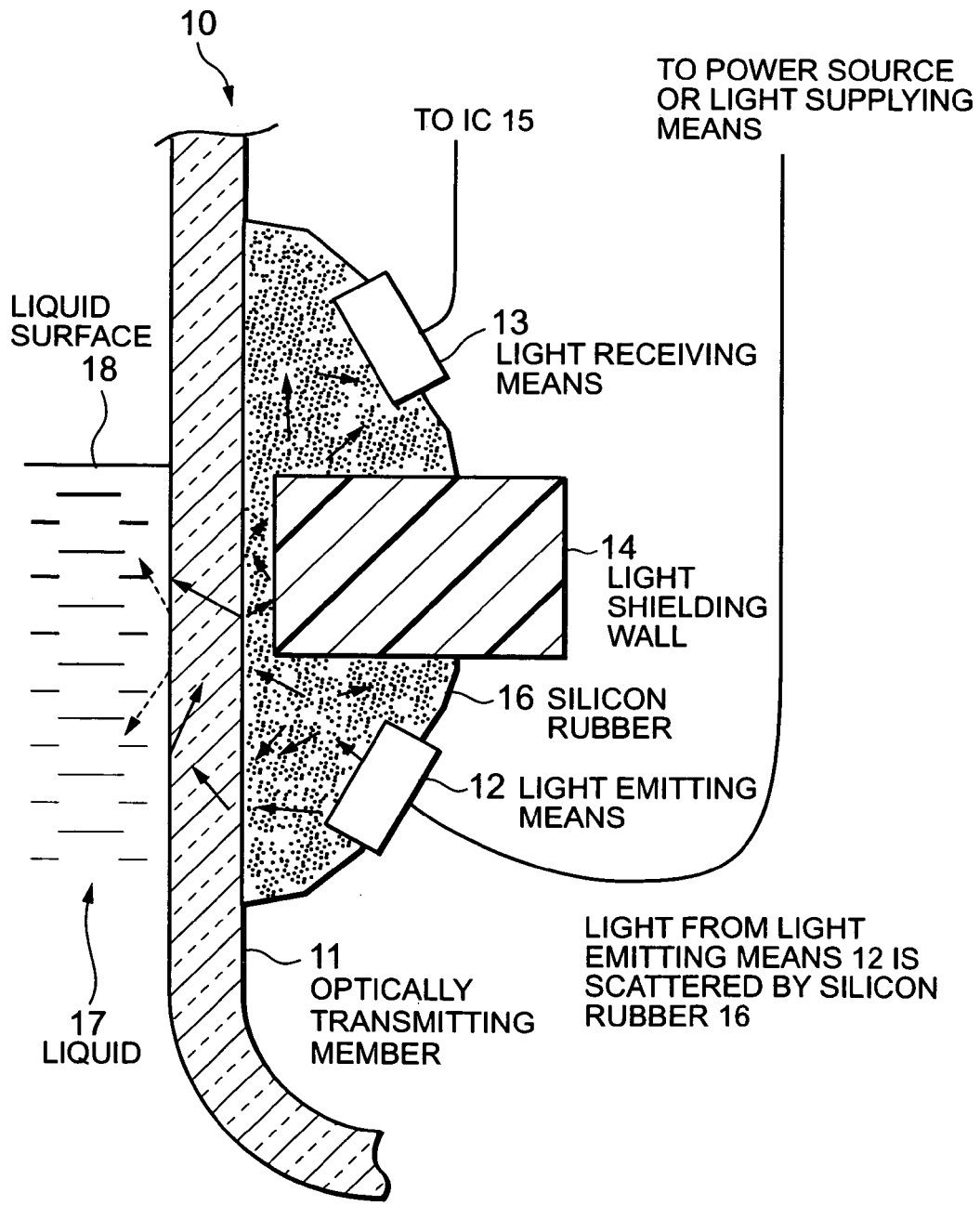
FIG. 2 is a sectional view showing a first embodiment according to the liquid surface level detecting apparatus in the present invention.

With reference to the drawings, the liquid surface level detecting apparatus in the present invention will be described below. At first, the first embodiment according to the liquid surface level detecting apparatus in the present invention is described. FIG. 1 is a diagrammatic view showing a usage state of the liquid surface level detecting apparatus in the present invention, and FIG. 2 is a sectional view showing the first embodiment according to the liquid surface level detecting apparatus in the present invention. By the way, FIG. 2 is an enlarged view of a dotted line section in FIG. 1. In a liquid surface level detecting apparatus 10 in the present invention, by inserting a pole-shaped section approximately vertically from above a vessel, for example, such as a tank or the like, and bringing a liquid 17 into contact with a liquid surface level detecting unit placed at a low portion, it carries out a liquid surface level detection.

The liquid surface level detecting apparatus 10 shown in FIG. 2 has the total length of approximately several ten cm, and it is provided with: an optically transmitting member (a light radiating means, an optically transmitting means) 11 which is hollow and made of bar-shaped fluoro-resin or glass and the like; a light emitting means 12 composed of optical fibers, light emitting diodes (LED) and the like which are placed in the hollow section therein; a light receiving means 13 for converting an optical energy into an electrical energy such as an electrical signal and the like; a light shielding wall (a light shielding means) 14 for preventing a light from the light emitting means from being directly irradiated to the light receiving means 13; an IC (Integrated Circuit) 15 for measuring a light amount received by the light receiving means 13 and outputting its measured result; and a light scattering member (a light scattering means, silicon rubber) 16 that covers the entire tips of the light emitting means 12 and the light receiving means 13 and has a property of scattering the irradiated light. By the way, for example, if the light emitting means 12 is the optical fiber, it is connected to a light supplying means, and if the light emitting means 12 is the light emitting diode, it is connected to a power source and the like. Also, as the light scattering member 16, the silicon rubber 16 having an adhesive property for fixing the light emitting means 12 or the light receiving means 13 is suitable, and in particular, a semi-transparent soft silicon sealant having a moisture absorption hardening property and a heat-resisting property is optimal.

By the way, the wavelength of the light used in this liquid surface level detection is not especially limited, and it is possible to use a visible region, an infrared region, an ultraviolet region and the other regions. Also, it is possible to place a prism and the like, and assign a directivity to the light from the light emitting means 12 or the light received by the light receiving means 13, and efficiently carry out the light emission or the light reception. Also, as the optically transmitting member 11, it is desirable to use the fluoro-resin that is high in durability against chemicals, such as PTFE (poly-tetra-fluoro-ethylene), PFA (per-fluoro-alkoxy), FEP (fluorescent-ethylene-propylene), ETFE (ethylene-tetra-fluoro-ethylene) and the like. In particular, it is desirable to use the PTFE that is stable and not melted even at a high temperature, the PFA that is cheap and easy to process, and the like. Also, since the optically transmitting member 11 has the optically transmitting property and serves as the liquid surface level detecting unit for radiating the light to external environment, the optically transmitting member 11 may be referred to as the light radiating means 11. Also, the optically transmitting member has only the role of protecting the apparatus from the external environment. Thus, even if the light scattering means 16 is directly exposed to the external environment (namely, the optically radiating means 11 and the light scattering means 16 are integrated into the same means) without placing the optically transmitting member 11 in the vicinity of the liquid surface level detecting unit, it is possible to attain the object of the present invention.

Figure 3:
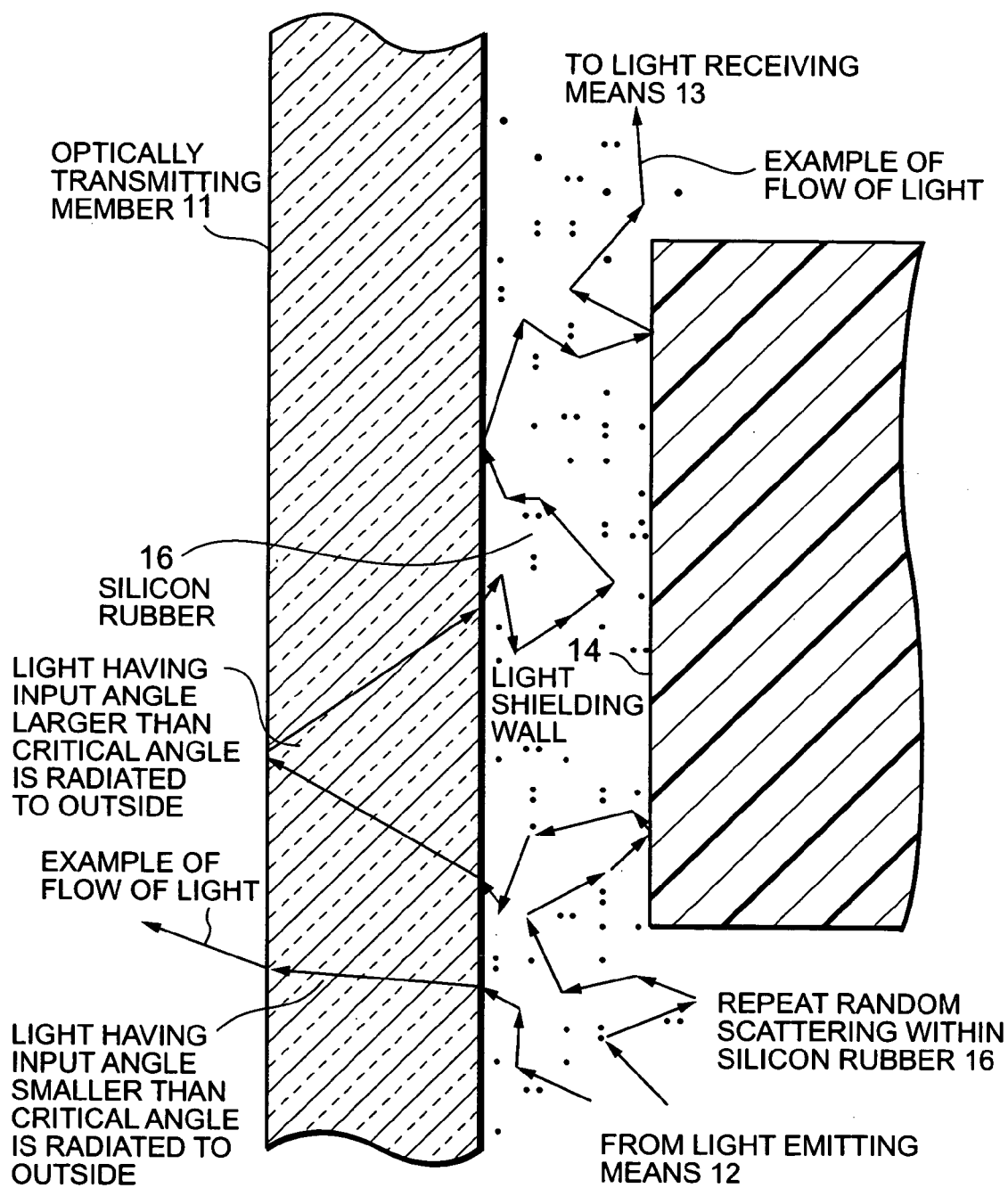
FIG. 3 is a diagrammatic view in which a vicinity of a liquid surface level detecting unit of the liquid surface level detecting apparatus in the present invention shown in FIG. 2 is enlarged.

FIG. 3 is a diagrammatic view in which the vicinity of the liquid surface level detecting unit of the liquid surface level detecting apparatus in the present invention shown in FIG. 2 is enlarged. With reference to FIG. 3, the operation of the liquid surface level detection and the flow of the light are described. For example, the material such as the silicon rubber 16 is the semi-transparent material in which a large number of particles are irregularly sporadic, and when the light is irradiated to the silicon rubber 16, the light is scattered within the silicon rubber 16. Thus, the light irradiated from the light emitting means 12 is scattered by the particles within the silicon rubber 16 and expanded in random directions. Then, the scattering light repeats the scattering caused by the particles, and for example, again returns to the direction in which the light emitting means 12 exists, or goes to the inner wall of the optically transmitting member 11. By the way, instead of the silicon rubber 16, it is also possible to use the material or member having the property of scattering the irradiated light.

Also, the light shielding wall 14 is designed such that the light receiving means 13 does not directly receive the light from the light emitting means 12. Consequently, it is possible to avoid the light from being directly irradiated from the light emitting means 12 to the light receiving means 13 and possible to shield the light that is obstructive of the liquid surface level detection. By the way, the meaning that the light is not directly irradiated to the light receiving means 13 from the light emitting means 12 is such that the light emitting means 12 and the light receiving means 13 are relatively placed so as not to directly irradiate the light, irrespectively of the presence or absence of the silicon rubber 16. Also, by establishing a predetermined angle and placing the light emitting means, it is possible to increase the average irradiation light amount to the vicinity of one unit (hereafter, referred to as the liquid surface level detecting unit) of the optically transmitting member 11 that radiates a part of the scattering light to the outside between the light emitting means 12 and the light receiving means 13. Similarly, by establishing a predetermined angle and placing the light receiving means, it is possible to increase the efficiency of the light reception and possible to improve the precision in the liquid surface level detection.

Moreover, even by giving an inclination to the light shielding wall 14 and making it serve as the role of a light reflection plate or independently placing the light reflection plate, similarly, it is possible to improve the precision in the liquid surface level detection. By the way, the length of this liquid surface level detecting unit is approximately several mm. Also, in order to protect the light from being absorbed by the light shielding wall 14, by painting the light shielding wall 14 white, or covering with film such as silver, aluminum and the like, it is possible to increase a light reflectance factor of the light shielding wall 14.

The light reaching the inner wall of the optically transmitting member 11, although a part thereof is reflected by the inner wall, is transmitted through the inside of the optically transmitting member 11, and reaches the outer wall of the optically transmitting member 11. If the liquid 17 does not exist in the outside (the external environment) of the optically transmitting member 11 (namely, if the outside is the air), the input light of the angle smaller than the critical angle with respect to a normal line to the outer wall of the optically transmitting member 11 is transmitted through the boundary of the outside and radiated to the outside (however, the part thereof is reflected by the outer wall). On the other hand, the input light of the angle equal to or greater than the critical angle brings about the total reflection on the outer wall. By the way, on the inner wall and outer wall of the optically transmitting member 11, the traveling route of the light obeys the law of the reflection refraction on its boundary. By the way, the fluoro-resin such as the PFA and the like is not strictly said to be transparent (namely, it is semi-transparent), and it has the property of scattering the light. However, for the purpose of simple explanation, here, the explanation of its effect is ignored.

The light, which is reflected by the inner wall or outer wall of the optically transmitting member 11 and returned to the inside of the optically transmitting member 11, further repeats the scattering within the silicon rubber 16 existing in the inside of the optically transmitting member 11 and the reflection on the light shielding wall 14. As a result, there is also the light which again reaches the outer wall of the optically transmitting member 11 and is transmitted through the outer wall and radiated to the outside. In this way, the light irradiated by the light emitting means 12 is roughly divided into the two lights of the light, which is scattered by the silicon rubber 16 and finally sent out to the outside of the optically transmitting member 11, and the light which is returned to the inside of the optically transmitting member 11. And, a part of the light, which repeats the scattering in the inside of the optically transmitting member 11, is received by the light receiving means 13. By the way, since the scattering light has the random direction, the average light amount at a static state is constant, and the radiation light amount (the average radiation light amount) to the outside of the optically transmitting member 11, the light amount (the average light reception amount) received by the light receiving means 13 are constant.

As mentioned above, if the external environment is not changed, the light reception amount received by the light receiving means 13 is constant. However, for example, such as the case that the rise in a liquid surface 18 causes the liquid surface to approach the liquid surface level detecting unit (or the case that the optically transmitting member 11 is inserted into the liquid 17) and the like, the change in the external environment leads to the change in the light reception amount of the light receiving means 13.

Also, the light reception amount of the light receiving means largely depends not only on the refractive index of the liquid 17 in the outside, but also on the absorption reflection spectral property of the liquid 17. For example, the white liquid such as milk and the like, the liquid metal such as silver and the like have the property of reflecting the visible region light. In such a case, it is possible to carry out the liquid surface level detection by selecting a wavelength region of a light to be used, on the basis of the absorption reflection spectral property of the liquid targeted for the liquid surface level detection.

Figure 4:
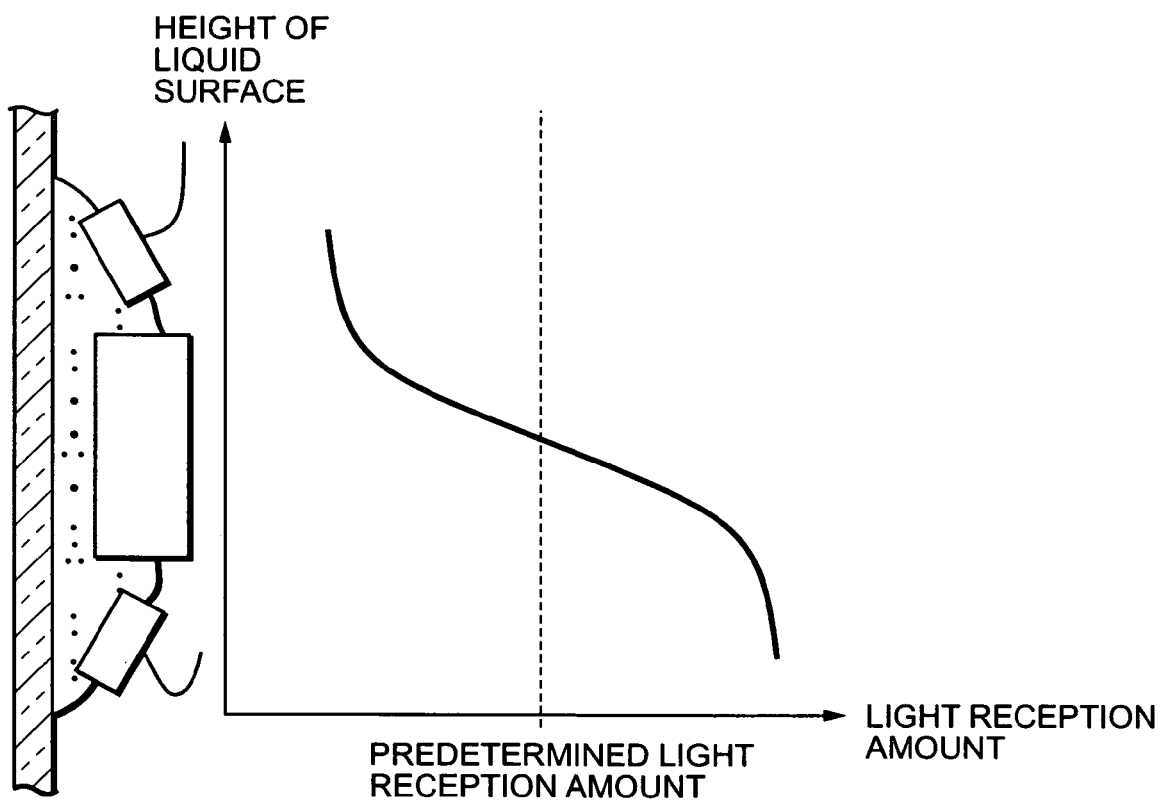
FIG. 4 is a diagrammatic graph showing a change in a light reception amount of a light receiving means when the liquid surface level detecting apparatus in the present invention detects a liquid surface.

FIG. 4 is a diagrammatic graph showing the change in the light reception amount of the light receiving means when the liquid surface level detecting apparatus in the present invention detects the liquid surface. If the liquid 17 having the refractive index greater than the air is raised and the liquid surface 18 reaches the liquid surface level detecting unit, a part of the scattering light reflected by the outer wall of the optically transmitting member 11 until that time is radiated into the liquid 17. That is, refractive indexes of mediums existing in the external environment become greater, and the light reflection transmittance property on the boundary between the liquid 17 and the optically transmitting member 11 is changed, thereby increasing the light amount to be radiated into the mediums. As a result, the light amount, which is reflected by the boundary between the liquid 17 and the optically transmitting member 11 and returned to the inside of the optically transmitting member 11, is reduced, thereby reducing the light reception amount of the light receiving means 13. In this way, by measuring the change in the light reception amount attenuated at the time of the propagation, it is possible to detect the liquid surface level of the liquid 17.

As mentioned above, according to the first embodiment, the light irradiated from the light emitting means 12, since scattered within the silicon rubber 16, has the effect similar to the light emitted to the random directions from a large number of light sources. Consequently, the range in which the liquid surface level is detected (the range in which the light is emitted to the outside, and the range in which the light once outputted to the outside is returned) becomes very wide. Then, even if the liquid drops and the liquid films are deposited on the vicinity of the liquid surface level detecting unit, it is possible to ignore those influences, and measure the change in the light amount in association with the variation in the liquid surface level, and surely carry out the liquid surface level detection.

Also, for example, by establishing that the IC 15 outputs a signal indicative of the liquid surface level detection if the light reception amount of the light receiving means 13 becomes a predetermined light reception amount (a standard light reception amount) or less, it is possible to report the liquid surface level detection to the outside. By the way, for example, it is desirable that an adjusting means, such as a trimmer and the like, can be used to simply adjust the predetermined light reception amount. Then, by enabling the different predetermined light reception amount to be established on the basis of a kind of a liquid, it is possible to carry out the liquid surface level detections of the liquids of the various kinds. Also, by establishing a plurality of values as the predetermined light reception amounts, it is also possible to detect the respective boundaries of the liquids 17 composed of a plurality of layers. Also, for example, when the variation in the light reception amount of the light receiving means 13 is measured, if there is the variation of a predetermined value or more, it is possible to establish that the IC 15 outputs the signal indicative of the liquid surface level detection.

Also, in the liquid 17 having the property of reflecting the light such as the above-mentioned white liquid and the like, when its liquid surface 18 reaches the liquid surface level detecting unit, the lights radiated to the outside of the optically transmitting member 11 until that time are all returned, thereby increasing the light reception amount of the light receiving means 13. Thus, for example, by establishing that the IC 15 outputs the signal indicative of the liquid surface level detection if the light reception amount of the light receiving means 13 becomes the predetermined light reception amount or more, it is possible to report the liquid surface level detection to the outside.

Figure 8:
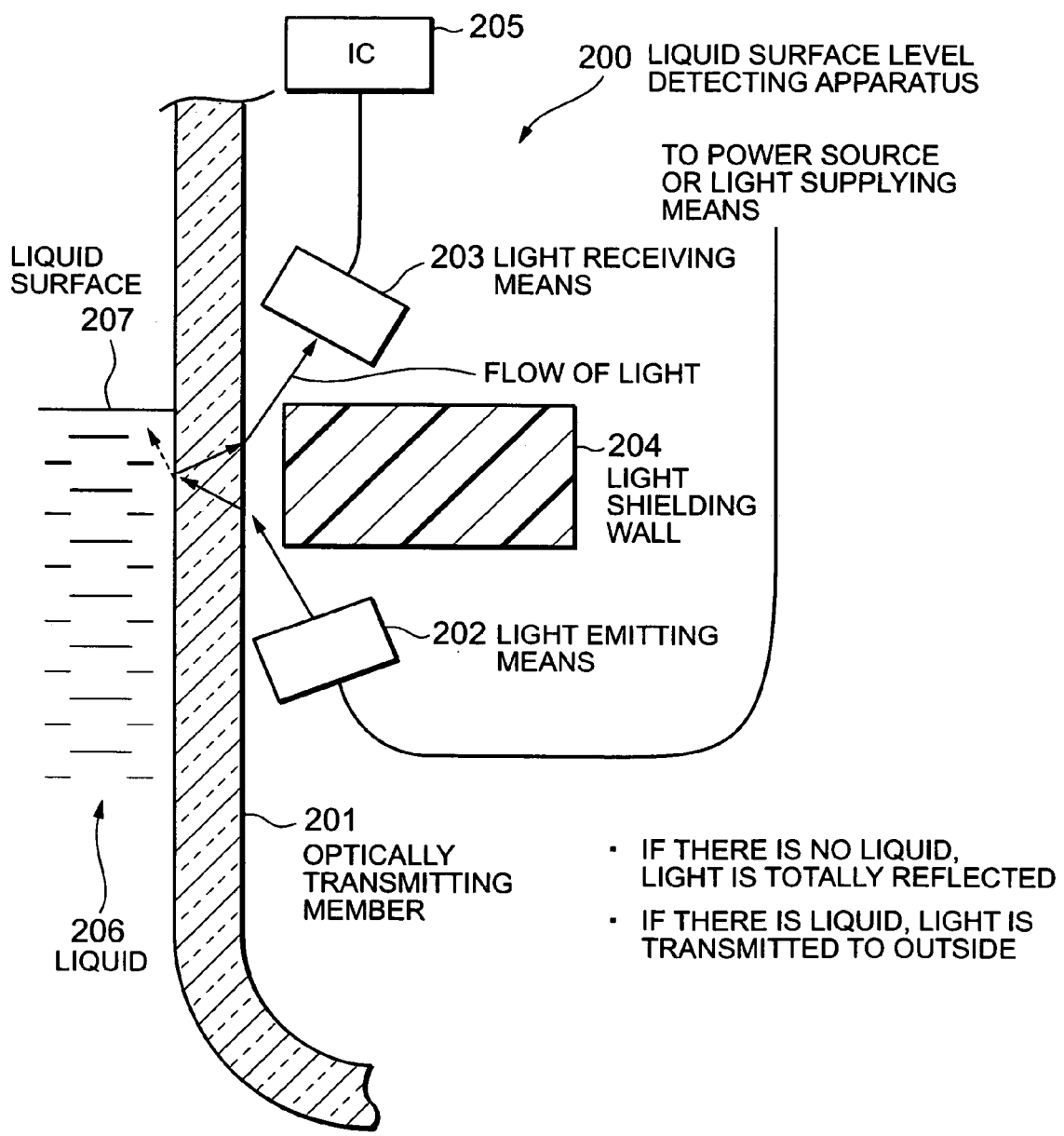
FIG. 8 is a sectional view of an example of a conventional liquid surface level detecting apparatus that uses a total reflection light.
Figure 9:
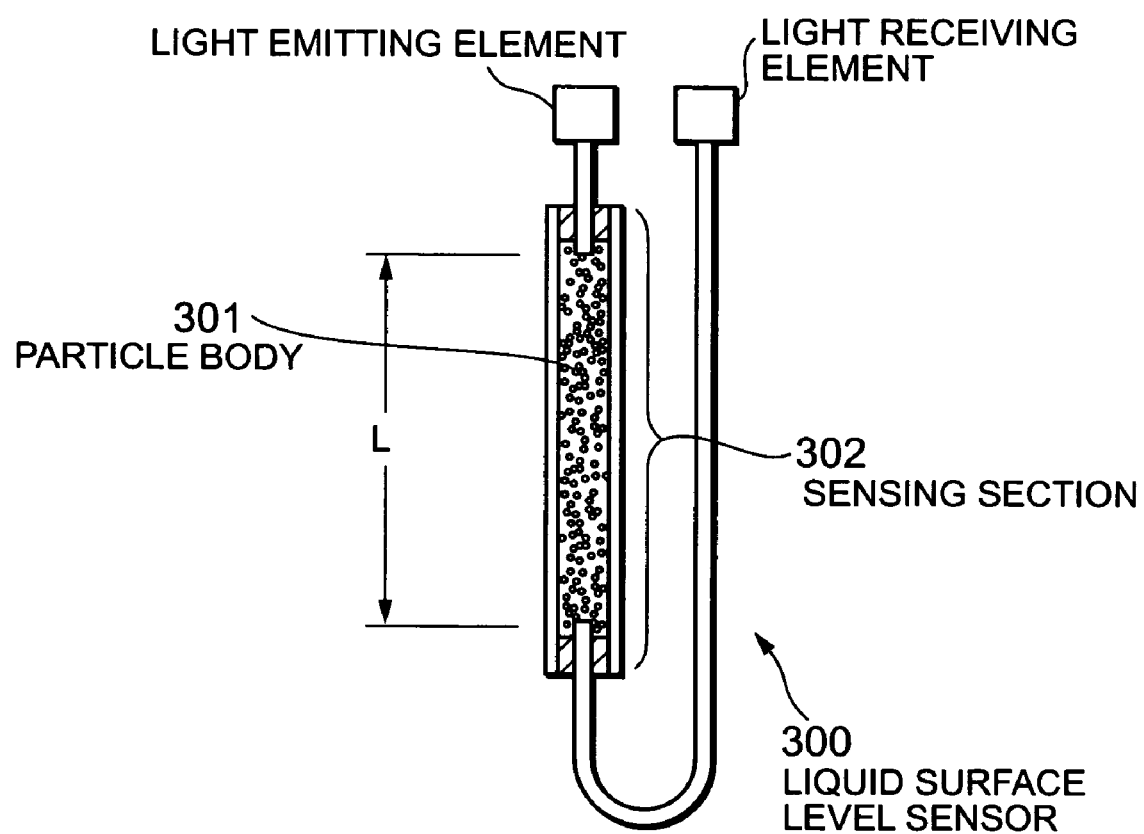
FIG. 9 is a sectional view of an example of a conventional liquid surface level detecting apparatus that uses a scattering light.
Figure 10:
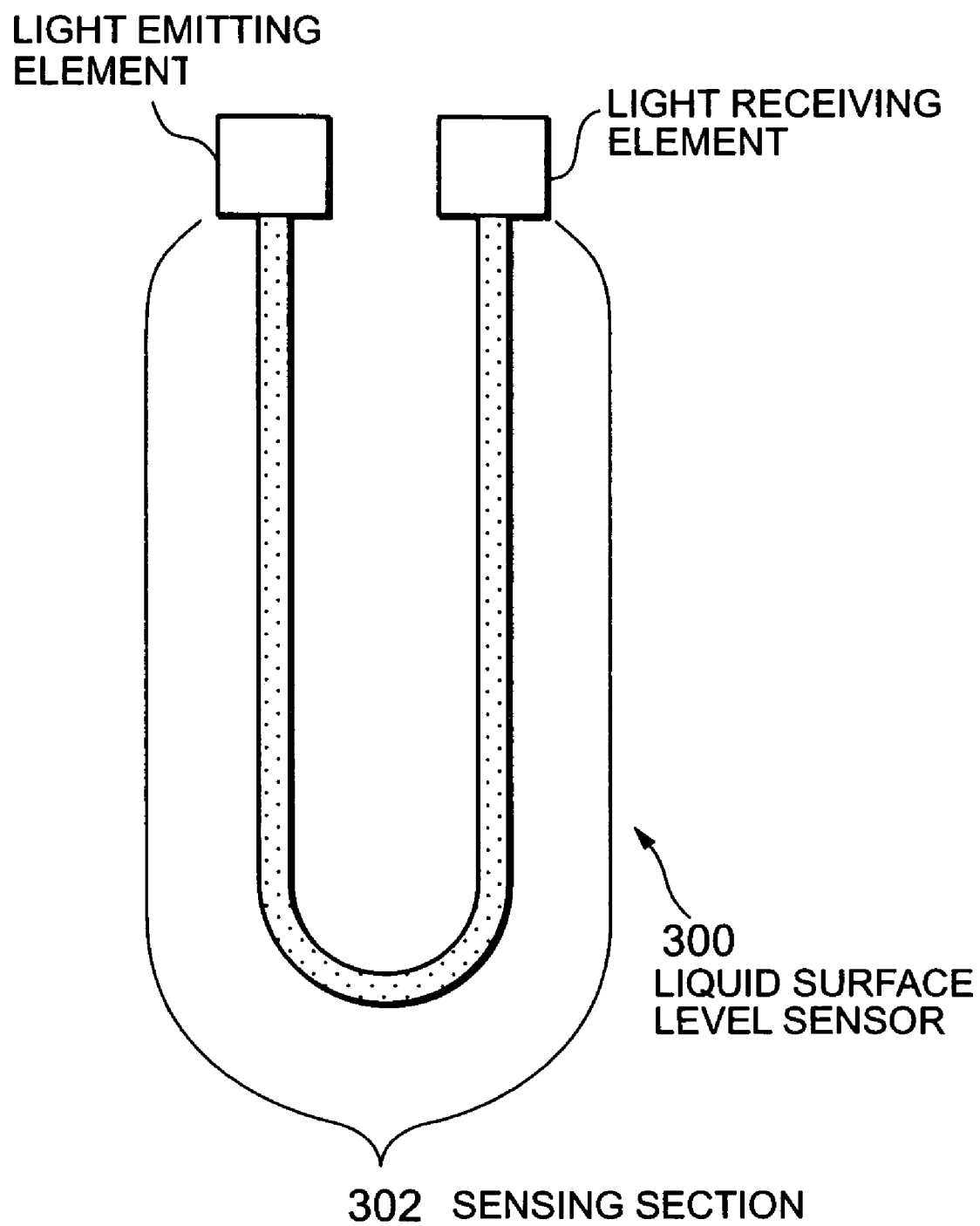
FIG. 10 is a sectional view of another example of the conventional liquid surface level detecting apparatus that uses the scattering light.

Also, since the variation in the light reception amount of the light receiving means 13 is the measurement target, it is not necessary to strictly define the installation positions of the light emitting means 12 and the light receiving means 13, and they may be installed such that the light from the light emitting means 12 can be received by the light receiving means 13. This is the point which is largely different from the fact that in the conventional liquid surface level detecting apparatus for measuring the presence or absence of the total reflection as shown in FIG. 8, the installation positions of the light emitting means 202 and the light receiving means 203 need to be strictly defined in accordance with the critical angle of the total reflection. Also, preferably, the installations are implemented such that the directivity to the vicinity of the liquid surface level detecting unit is assigned to the light emitting means 12 and the light receiving means 13, the light from the light emitting means 12 is efficiently irradiated to the vicinity of the liquid surface level detecting unit, and the light emitted from the vicinity of the liquid surface level detecting unit can be efficiently received by the light receiving means 13.

Also, in the above-mentioned first embodiment, by adhering the silicon rubber 16 to the light emitting means 12 and the light receiving means 13 in addition to the entire vicinities of the liquid surface level detecting units, it is possible to fix the light emitting means 12, the light receiving means 13, the light shielding wall 14 and the like with the silicon rubber 16. In particular, the silicon rubber 16 has the high adhering property to the fluoro-resin such as the PFA, the PTFE and the like. Thus, it is possible to stably install the respective means of the vicinity of the liquid surface level detecting unit. As a result, it is possible to stabilize the operation of the liquid surface level detection.

Second Embodiment

Figure 5:
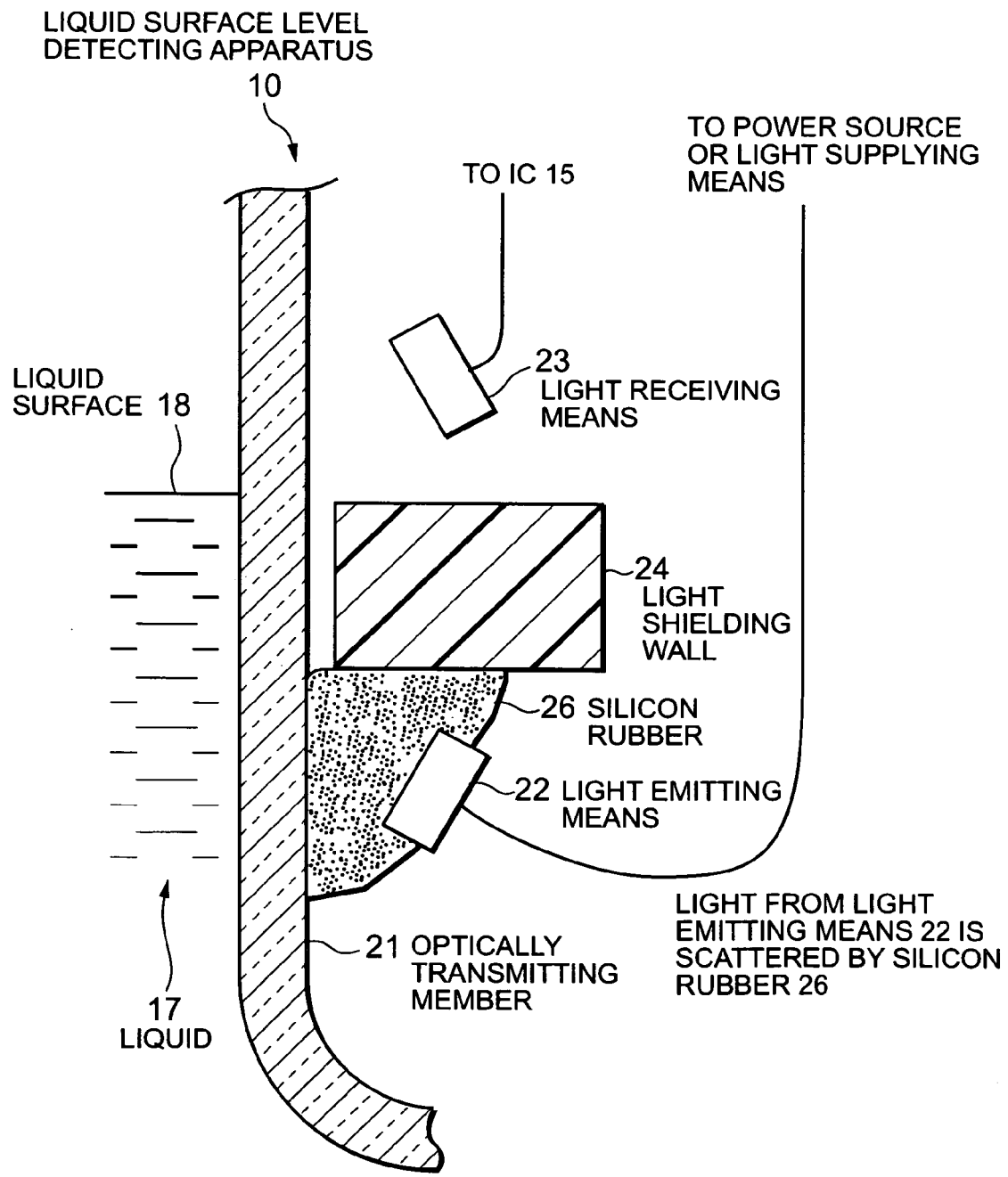
FIG. 5 is a sectional view showing a second embodiment according to the liquid surface level detecting apparatus in the present invention.

The second embodiment according to the liquid surface level detecting apparatus in the present invention will be described below. FIG. 5 is a sectional view showing the second embodiment according to the liquid surface level detecting apparatus in the present invention. The liquid surface level detecting apparatus 10 in the present invention shown in FIG. 5 is provided with an optically transmitting member 21, a light emitting means 22, a light receiving means 23, a light shielding wall 24 and a silicon rubber 26, similarly to the liquid surface level detecting apparatus in FIG. 2. However, this is designed such that the silicon rubber 26 exists only in the vicinity of the light emitting means 22.

This liquid surface level detecting apparatus 10 in the present invention shown in FIG. 5 is designed such that the silicon rubber 26 makes the light from the light emitting means 22 serve as the scattering light, and the scattering light is irradiated to the liquid surface level detecting unit. The light returned by the reflection by the liquid surface level detecting unit is propagated toward the light receiving means 23 while repeating the reflection, for example, at the interval between the light shielding wall 24 and the optically transmitting member 21. Thus, the liquid surface level detection by the light receiving means 23 becomes possible. Hence, similarly to the liquid surface level detecting apparatus 10 explained in the first embodiment shown in FIG. 2, it is possible to irradiate the scattering light to the liquid surface level detecting unit. By measuring the change in the light reception amount of the light receiving means 23, it is possible to carry out the liquid surface level detection of the liquid 17.

As mentioned above, according to the second embodiment, the light irradiated from the light emitting means 22, since scattered within the silicon rubber 26 placed in the light emitting means 22, has the effect similar to the light emitted to the random directions from the large number of light sources. Consequently, the range in the detection of the liquid surface level becomes very wide. Even if the liquid drops and the liquid films are deposited on the vicinity of the liquid surface level detecting unit, it is possible to ignore those influences, and measure the change in the light amount in association with the variation in the liquid surface level, and surely carry out the liquid surface level detection.

Third Embodiment

Figure 6:
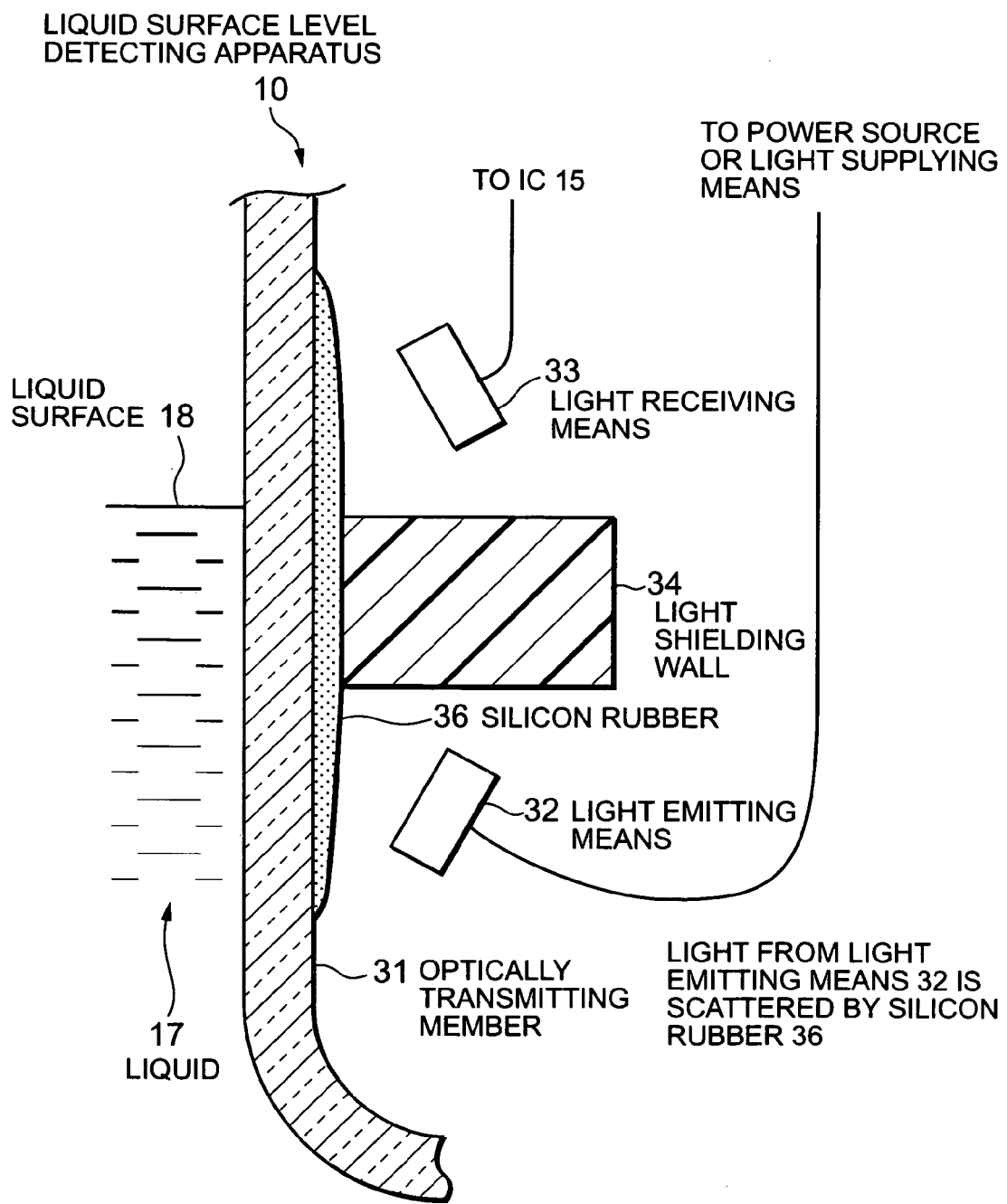
FIG. 6 is a sectional view showing a third embodiment according to the liquid surface level detecting apparatus in the present invention.
Figure 7:
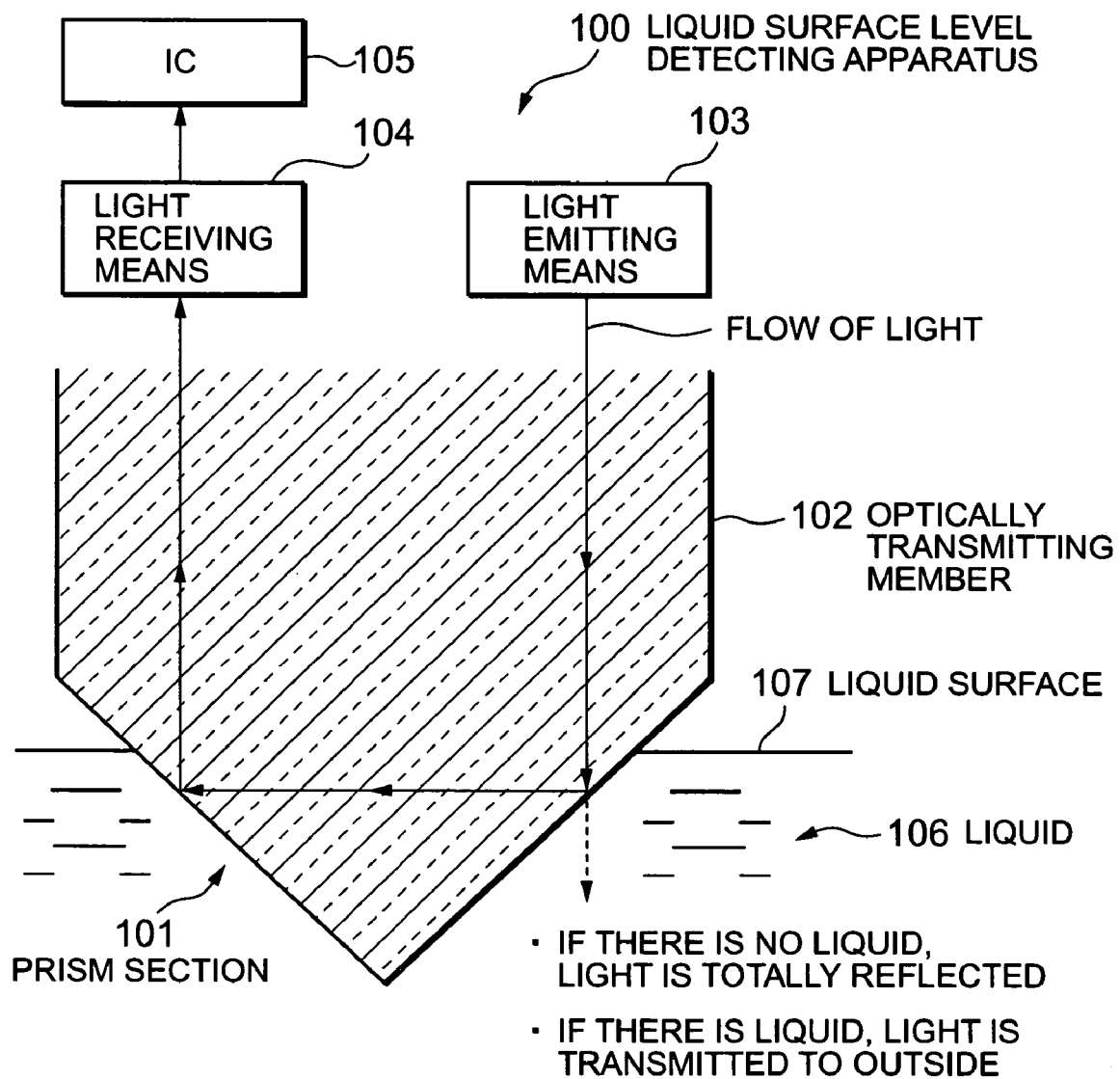
FIG. 7 is a sectional view of an example of a conventional liquid surface level detecting apparatus that uses a reflection of a light by a prism.

Moreover, the third embodiment according to the liquid surface level detecting apparatus in the present invention will be described below. FIG. 6 is a sectional view showing the third embodiment according to the liquid surface level detecting apparatus in the present invention. The liquid surface level detecting apparatus 10 in the present invention shown in FIG. 6 is provided with an optically transmitting member 31, a light emitting means 32, a light receiving means 33, a light shielding wall 34 and a silicon rubber 36, similarly to the liquid surface level detecting apparatus in FIG. 2. However, this is designed such that the silicon rubber 36 exists only in the whole on the inner wall (the vicinity of the liquid surface level detecting unit) of the optically transmitting member 31.

This liquid surface level detecting apparatus 10 in the present invention shown in FIG. 6 is designed such that the silicon rubber 36 makes the light reaching the boundary between the liquid 17 and the optically transmitting member 31 serve as the scattering light. Thus, similarly to the liquid surface level detecting apparatuses explained in the first and second embodiments shown in FIG. 2 and FIG. 5, it is possible to irradiate the scattering light to the liquid surface level detecting unit. By measuring the change in the light reception amount of the light receiving means 33, it is possible to carry out the liquid surface level detection of the liquid 17.

As mentioned above, according to the third embodiment, the light irradiated from the light emitting means 32, since scattered within the silicon rubber 36 placed on the entire inner wall of the optically transmitting member 31, has the effect similar to the light emitted to the random directions from the large number of light sources. Consequently, the range in the detection of the liquid surface level becomes very wide. Even if the liquid drops and the liquid films are deposited on the vicinity of the liquid surface level detecting unit, it is possible to ignore those influences, and measure the change in the light amount in association with the variation in the liquid surface level, and surely carry out the liquid surface level detection.

Fourth Embodiment

Figure 13:
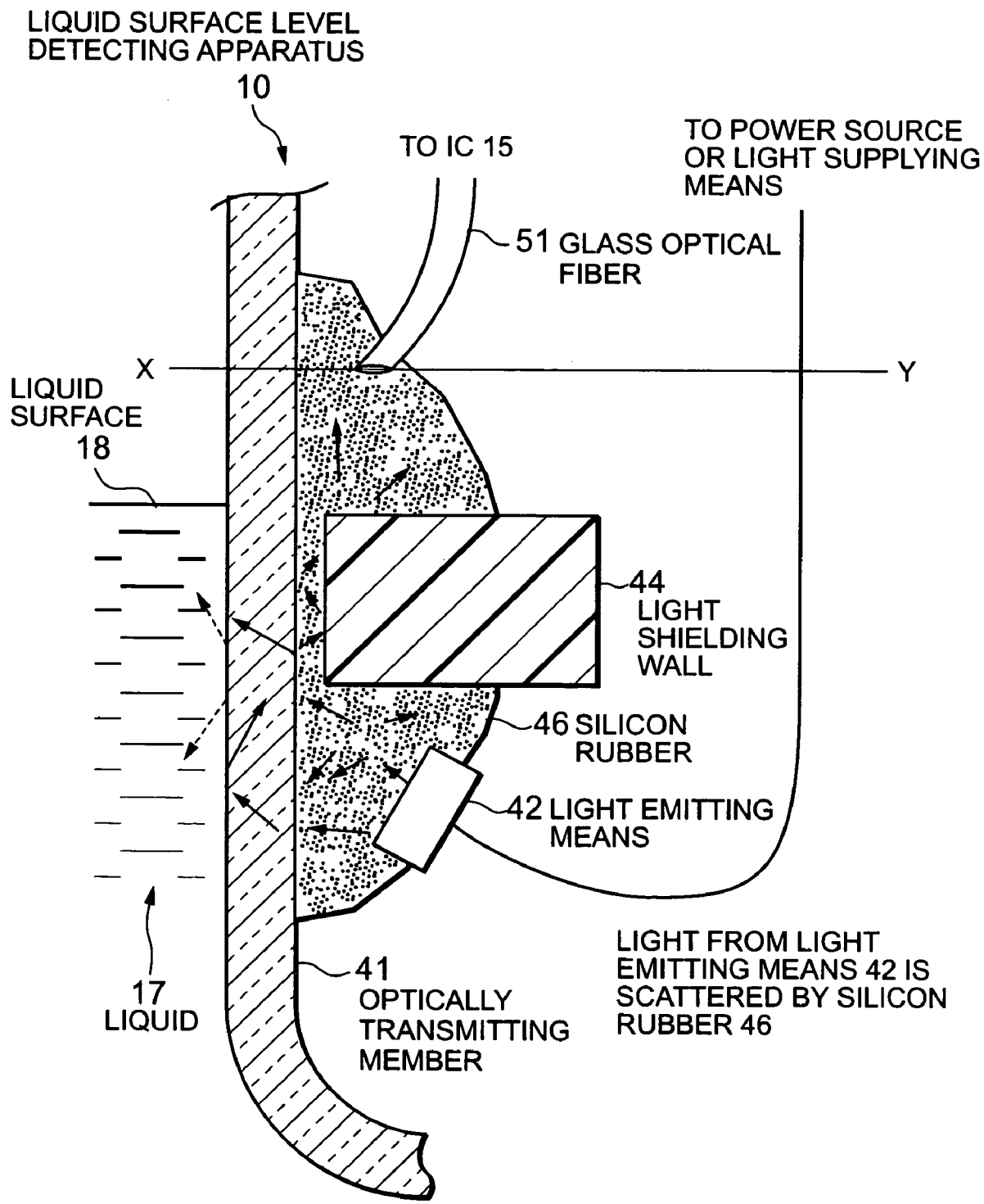
FIG. 13 is a sectional view showing a fourth embodiment according to the liquid surface level detecting apparatus in the present invention.

Moreover, the fourth embodiment according to the liquid surface level detecting apparatus in the present invention will be described below. FIG. 13 is a sectional view showing the fourth embodiment according to the liquid surface level detecting apparatus in the present invention. The liquid surface level detecting apparatus 10 in the present invention shown in FIG. 13 is provided with an optically transmitting member 41, a light emitting means 42, a light shielding wall 44 and a silicon rubber 46, similarly to the liquid surface level detecting apparatus in FIG. 2. Also, as the light receiving means 13 shown in FIG. 2, a glass optical fiber 51 is used. This glass optical fiber 51 has a merit that it is strong in a high temperature and the like, which will be described later.

Figure 14:
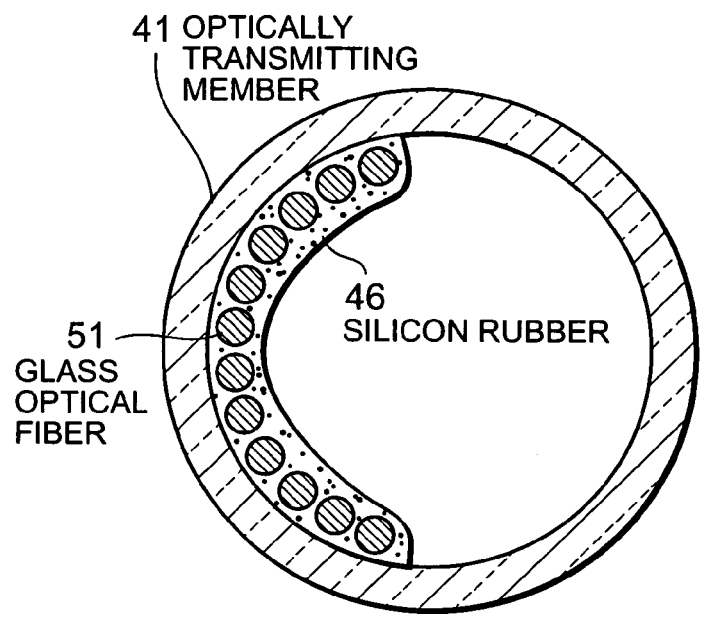
FIG. 14 is a view of a case that a plurality of glass optical fibers of the liquid surface level detecting apparatus shown in FIG. 13 are installed, and an X-Y sectional view of FIG. 13.

Also, FIG. 14 is a view of a case that a plurality of glass optical fibers of the liquid surface level detecting apparatus shown in FIG. 13 are installed, and an X-Y sectional view of FIG. 13. In this way, the installation of the plurality of glass optical fibers 51 enables those glass optical fibers 51 to receive the lights which are reflected by and returned from the liquid surface level detecting unit.

If an area of a light receiving section of light is small, in a case that water drops remain in the liquid surface level detecting unit or in other cases, an erroneous operation is easily induced. On the other hand, in a case of considering the scale and weight reductions in the liquid surface level detecting apparatus 10, it is impossible to excessively enlarge the light receiving section. So, in the forth embodiment, as shown in FIG. 14, for example, the plurality of (12 in FIG. 14) glass optical fibers 51 having a diameter of 1 mm are arrayed. Consequently, even if the water drops are deposited on the vicinity of the liquid surface level detecting unit, it is possible to ignore the influence of the water drops, and measure the change in the light amount in association with the variation in the liquid surface level, and surely carry out the liquid surface level detection.

As mentioned above, according to the fourth embodiment, the light irradiated from the light emitting means 42, since scattered within the silicon rubber 46, has the effect similar to the light emitted to the random directions from the large number of light sources. Consequently, the range in the detection of the liquid surface level becomes very wide. Even if the liquid drops and the liquid films are deposited on the vicinity of the liquid surface level detecting unit, it is possible to ignore those influences, and measure the change in the light amount in association with the variation in the liquid surface level, and surely carry out the liquid surface level detection.

Also, in particular, as shown in FIG. 14, by arraying the light receiving sections of the plurality of glass optical fibers 51 on a substantially flat surface along the inner wall of the optically transmitting member 41, it is possible to detect the level of the liquid surface, which is the substantially flat surface, at a high precision, and possible to protect the erroneous operation caused by the liquid drops and the liquid films. By the way, FIG. 14 illustrates the array pattern in which the light receiving sections of the plurality of glass optical fibers 51 are arrayed along the inner wall of the optically transmitting member 41. However, the array pattern of the light receiving sections in the present invention is not limited to the above-mentioned array pattern. For example, correspondingly to the shape of the liquid surface level detecting apparatus 10, it is possible to determine the array pattern of the plurality of light receiving sections. For example, as described later (FIG. 15), in the liquid surface level detecting apparatus 10 that can carry out the liquid surface level detection from the outside without dipping into the liquid, it is desired to prepare the array pattern corresponding to the shape of a pressurizing tank 91.

Figure 11:
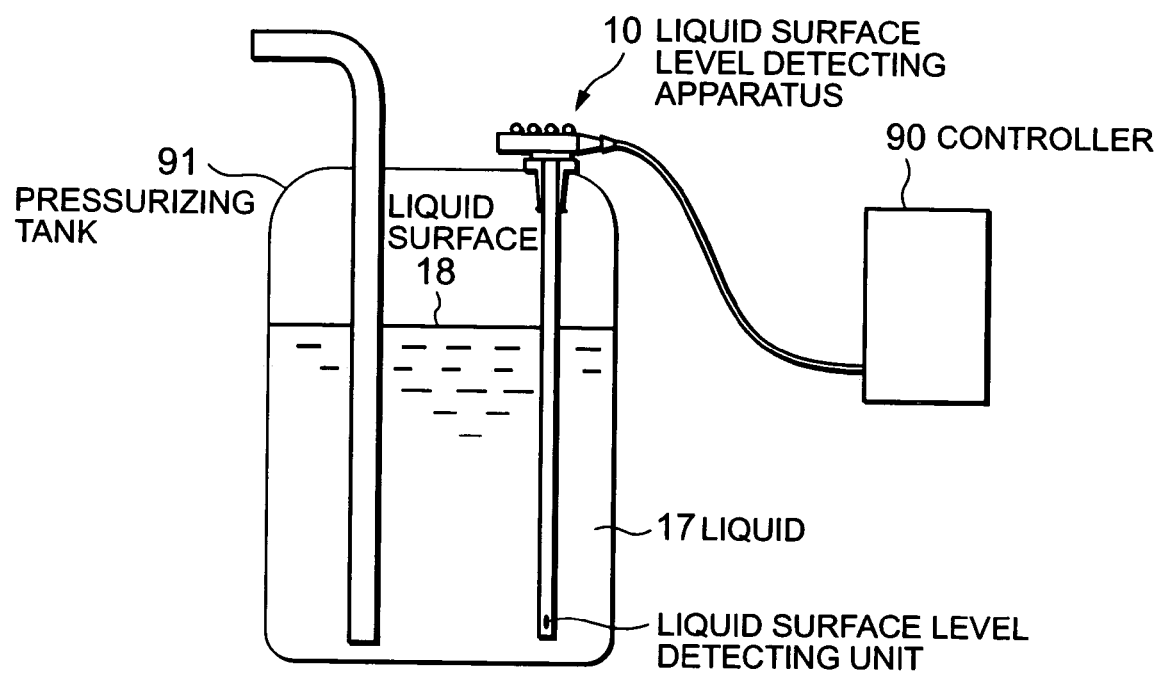
FIG. 11 is a diagrammatic view showing a first example of a usage state of the liquid surface level detecting apparatus in the present invention.

An application example of the liquid surface level detecting apparatus in the present invention as mentioned above will be described below. FIG. 11 is a diagrammatic view showing a first example of a usage state of the liquid surface level detecting apparatus in the present invention. By the way, a controller 90 for carrying out its operation control and a process of a measurement result and the like is connected to the liquid surface level detecting apparatus 10. A state at which the apparatus in the present invention is inserted into the liquid 17 within the pressurizing tank 91 is illustrated. By freely establishing a length of a pole-shaped section having the liquid surface level detecting unit in a low portion, it is possible to manufacture the liquid surface level detecting apparatus 10 that is easily usable depending on a situation. For example, in a gallon bottle for a drug, a pressuring tank, a pail can and the like, the pole-shaped section is desired to have the longest length of about 330 mm, and in a drum can and the like, the pole-shaped section is desired to be about 80 mm.

Figure 12A:
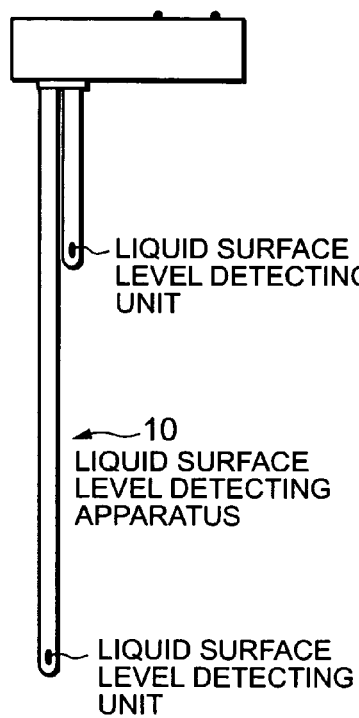
FIG. 12A is a diagrammatic view showing a first example of placing liquid surface level detecting units at different heights, in the liquid surface level detecting apparatus in the present invention.
Figure 12B:
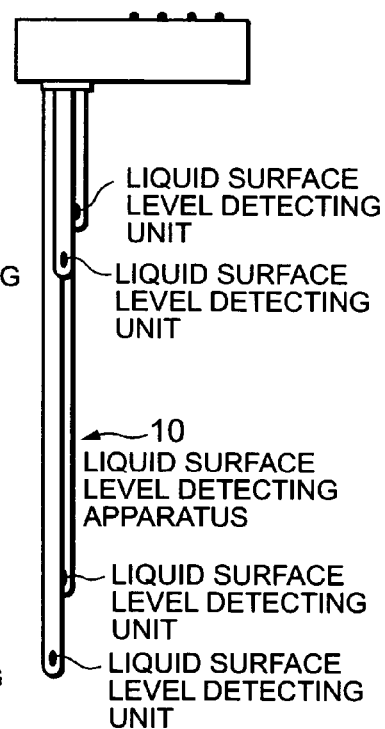
FIG. 12B is a diagrammatic view showing a second example of placing the liquid surface level detecting units at different heights, in the liquid surface level detecting apparatus in the present invention.
Figure 12C:
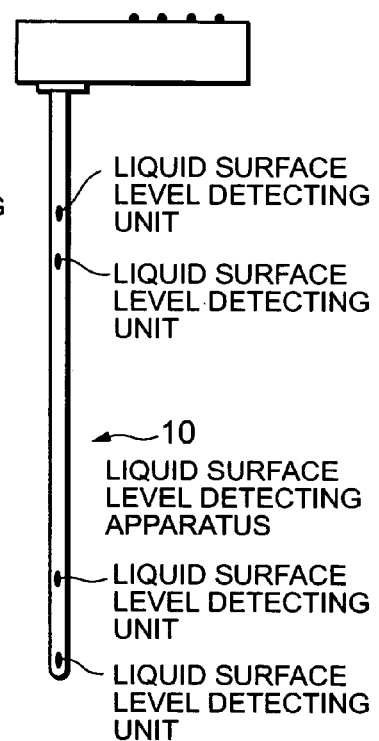
FIG. 12C is a diagrammatic view showing a third example of placing the liquid surface level detecting units at different heights, in the liquid surface level detecting apparatus in the present invention.

Also, FIGS. 12A to 12C are diagrammatic views showing examples of placing the liquid surface level detecting units at different heights, in the liquid surface level detecting apparatus in the present invention. As shown in FIG. 12A and FIG. 12B, by placing a plurality of pole-shaped sections having different heights, it is possible to carry out the liquid surface level detection at the different heights. By the way, in the liquid surface level detecting apparatus 10 shown in FIG. 12A, the liquid surface level detection is possible at different two points, and in the liquid surface level detecting apparatus 10 shown in FIG. 12B, the liquid surface level detection is possible at different four points. Also, if the plurality of pole-shaped sections are placed in this way, the usage in a small tank becomes difficult. Thus, as shown in FIG. 12C, by placing the liquid surface level detecting units having the different heights in a single pole-shaped section, it is possible to miniaturize the liquid surface level detecting apparatus 10 due to the plurality of locations.

Figure 15:
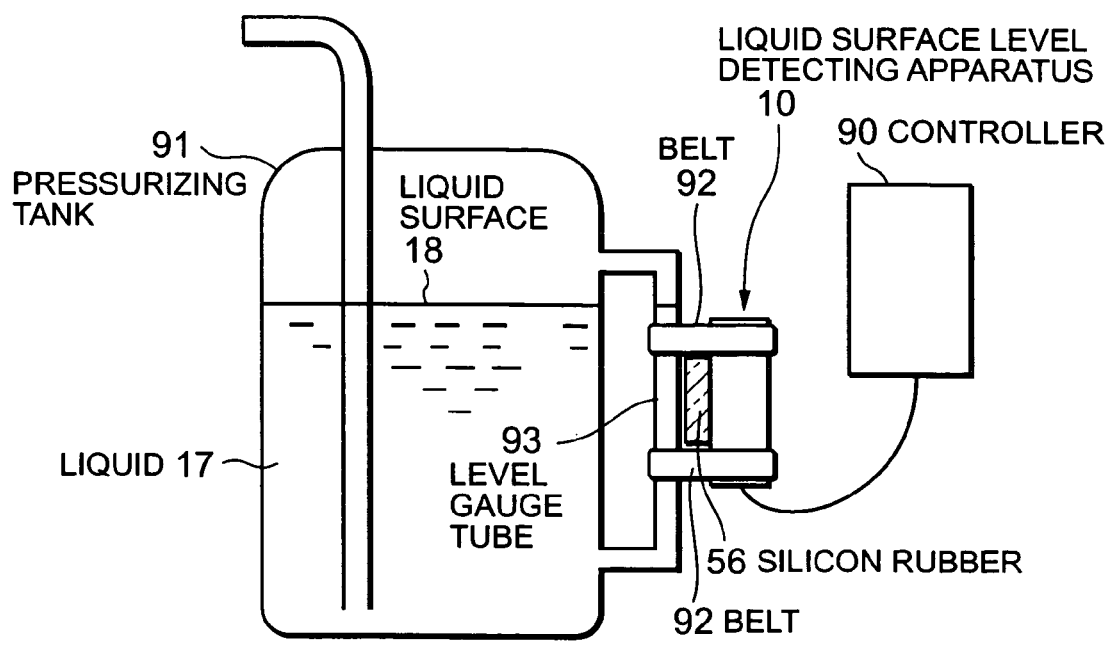
FIG. 15 is a diagrammatic view showing a second example of the usage state of the liquid surface level detecting apparatus in the present invention.

Also, FIG. 15 is a diagrammatic view showing a second example of the usage state of the liquid surface level detecting apparatus in the present invention. The usage example shown in FIG. 11 is designed so as to directly insert the liquid surface level detecting unit of the liquid surface level detecting apparatus 10 in the present invention into the liquid 17 and detect the liquid surface 18. However, the usage example shown in FIG. 15 is designed so as to install the liquid surface level detecting unit in a level gage tube 93 of the pressurizing tank 91, which is typically used for a visual inspection of a liquid surface level and the like, and detect the liquid surface 18. Consequently, if it is difficult to dip the liquid surface level detecting unit into the liquid 17, or if the liquid 17 is a dangerous material (for example, a material having a high reactivity, or a material of a high temperature or low temperature), without directly dipping into the liquid 17, it is possible to detect the liquid surface level. By the way, in a case of detecting the liquid surface level of the liquid accommodated in the vessel (the pressurizing tank) 91 where the level gage tube 93 does not exist, it is also possible to directly install the liquid surface level detecting unit in the vessel 91.

Also, it is desirable to install a fixing means (a belt) 92 for fixing the liquid surface level detecting unit on the outer wall of the vessel 91 for accommodating the liquid. For example, by using the belt 92 shown in FIG. 15 and wrapping the belt 92 around an outer circumference of the vessel, it is possible to fix the liquid surface level detecting unit at a predetermined position of the vessel 91. Also, as the fixing means 92, an adhesive surface having a viscosity is placed. Then, by using this adhesive surface, the liquid surface level detecting unit can be pasted on the vessel 91.

Also, as shown in FIG. 15, a silicon rubber 56 can be directly applied to the outer wall of the vessel 91. This leads to the merits that there is no leakage of the light from gap and the like (optical adhesiveness), and due to the viscosity of the silicon rubber 56, there is no displacement, and sticking on the outer wall of the vessel 91 is possible without using the belt 92, and the invasion of the liquid into the outer wall between the vessel 91 and the silicon rubber 56 can be protected, and the erroneous operation is protected. Also, by using the silicon rubber curing solution of the same property, it is also possible to adhere the liquid surface level detecting unit and the vessel 91.

Also, there is a case that the liquid targeted for the liquid surface level detection and the operation environment are at a high temperature. In particular, if the liquid is oil and the like, there may be a case that the liquid surface level of the liquid close to about 200° C. needs to be detected. However, for example, when an LED light source of a semiconductor is used for the light emitting means 12, 22, 32 or 42, if it exceeds about 80° C., the LED light source is broken which disables the detecting operation. In view of the operation at the time of such a high temperature, by using a small precise lamp (a tungsten lamp) as the light emitting means 22 and by using the glass optical fiber as the light receiving means 13, 23 or 33, it is excellently operated even at the time of the high temperature of about 300° C., thereby insuring the liquid surface level detecting operation at the time of the high temperature.

INDUSTRIAL APPLICABILITY

As mentioned above, according to the present invention, by placing a light shielding means so as not to directly irradiate the light from the light emitting means to the light receiving means, the part of the scattering light scattered by the light scattering means is radiated to the outside of the scattering means or the light transmitting means in the liquid surface level detecting unit of the light radiating means. On the other hand, the scattering light which is reflected and returned without being radiated is received by the light receiving means, and the change in its light reception amount is detected. Thus, the usage is possible in the various detection targets and usage environments without selecting the detection target. It is possible to efficiently irradiate the light to the liquid surface level detecting unit, and detect the variation in the light reception amount of the light receiving means at the high sensibility. It is possible to attain the liquid surface level detecting apparatus, which is excellent in the durability, easy to manufacture, and can be actually used.

The invention claimed is:

1. A liquid surface level detecting apparatus for detecting a liquid surface level of a liquid existing in an outside, including:
   a light emitting means for emitting a light;
   an optically scattering means for scattering the light emitted by said light emitting means;
   a light radiating means having a liquid surface level detecting unit for radiating a part of a scattering light scattered by said optically scattering means to an outside of said optically scattering means;
   a light receiving means for receiving said scattering light which is reflected by and returned from a boundary of the outside of said optically scattering means or said light radiating means without being radiated by said light radiating means; and
   a light shielding means for shielding the light so that the light from said light emitting means is not directly irradiated to said light receiving means,
   wherein if said liquid exists in said outside, a radiation light amount to the outside of said light radiating means is changed, and that change is detected on the basis of the light reception amount of said light receiving means, thereby detecting said liquid surface level of said liquid.

2. The liquid surface level detecting apparatus according to claim 1, characterized by establishing a predetermined angle and placing said light emitting means or light receiving means.

3. The liquid surface level detecting apparatus according to claim 1, characterized by placing a plurality of said light receiving means.

4. The liquid surface level detecting apparatus according to claim 3, characterized by arraying said plurality of light receiving means on a substantially flat surface.

5. The liquid surface level detecting apparatus according to claim 1, characterized by covering said light shielding means with a film for light reflection, in order to protect the light from being absorbed by said light shielding means.

6. The liquid surface level detecting apparatus according to claim 1, characterized by enabling a standard light reception amount in said light receiving means to be established on the basis of a kind of said liquid, and comparing the light reception amount of said light receiving means with said standard light reception amount, and consequently detecting said liquid surface level of said liquid.

7. The liquid surface level detecting apparatus according to claim 1, characterized by placing said optically scattering means around a light emitting unit of said light emitting means.

8. The liquid surface level detecting apparatus according to claim 1, characterized by placing said optically scattering means around said liquid surface level detecting unit to which said light from said light emitting means is irradiated.

9. The liquid surface level detecting apparatus according to claim 1, characterized in that said optically scattering means is silicon rubber.

10. The liquid surface level detecting apparatus according to claim 1, characterized in that said light radiating means is per-fluoro-alkoxy.

11. The liquid surface level detecting apparatus according to claim 1, characterized by using a tungsten lamp as said light emitting means and using a glass optical fiber as said light receiving means.

12. The liquid surface level detecting apparatus according to claim 1, characterized by dipping said light radiating means into said liquid and detecting said liquid surface level of said liquid.

13. The liquid surface level detecting apparatus according to claim 1, characterized by placing said light radiating means on an outer wall of a vessel having an optically transmitting property and detecting said liquid surface level of said liquid accommodated in said vessel.

14. The liquid surface level detecting apparatus according to claim 13, characterized by including a fixing means for enabling said light radiating means to be fixed on the wall of said vessel.

* * * * *